R. ICHIBA.
DRILL AND WIRE GAGE.
APPLICATION FILED MAY 24, 1919.
1,342,288.
Patented June 1, 1920.
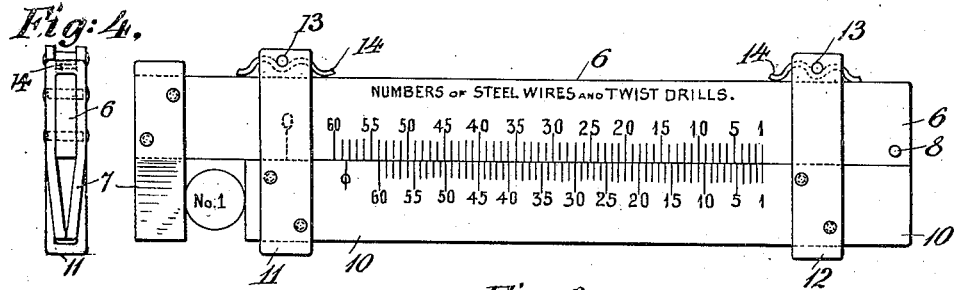
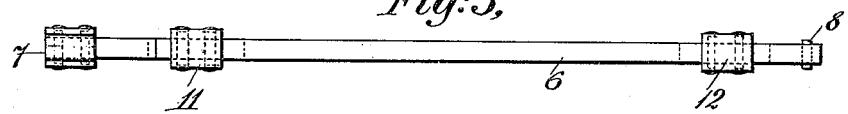
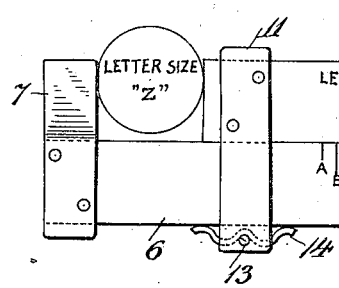 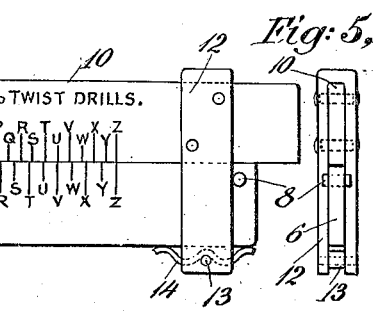
WITNESSES
E. A. Hagen
J. C. Ledbetter
INVENTOR
Rihachi Ichiba,
BY
ATTORNEYS

UNITED STATES PATENT OFFICE.

RIHACHI ICHIBA, OF NEW YORK, N. Y.

DRILL AND WIRE GAGE.

1,342,288.  Specification of Letters Patent.  Patented June 1, 1920.

Application filed May 24, 1919. Serial No. 299,467.

*To all whom it may concern:*

Be it known that I, RIHACHI ICHIBA, a subject of the Mikado of the Japanese Empire, and a resident of the city of New York, borough of Manhattan, county of New York, and State of New York, have invented a new and Improved Drill and Wire Gage, of which the following is a full, clear, and exact description.

This invention relates to drill and wire gages, and to caliper gages. More particularly the invention relates to a size gage for picking out or determining proper diametral sizes of drills, wire, rods and the like.

An object of the invention is to provide a caliper gage which may be readily applied to twist drills, wire of all kinds, and rods, for calipering the size thereof and for permitting the mechanic to read the drill or wire size directly from the graduated scale of the caliper.

A particular object of the invention is to provide a precision instrument capable of accomplishing the aforesaid purposes, and which will be provided with a set of lettered size graduations upon one side of the precision instrument, and a set of numbered size graduations upon the other side thereof.

With the above principal objects, and others in view, the invention relates to a certain arrangement and construction of precision measurement instrument parts, an example of which is disclosed within the following specification, specifically pointed out in the appended claims, and delineated in the accompanying drawings, wherein:

Figure 1 shows a side elevation of the caliper gage with numeralized graduations thereon, and Fig. 2 shows the reverse side of the caliper gage or precision instrument with lettered size graduations imprinted thereon.

Fig. 3 shows a bottom edge view of the caliper gage, and Fig. 4 shows an end view of Fig. 1, while Fig. 5 shows an end view of Fig. 2.

In the practice of mechanics, and in executing careful, refined and accurate work, it becomes necessary to make quick and accurate selection of sizes of steel wires and twist drills. The steel wires and twist drills are known in the market under both numbered sizes and lettered sizes. Some manufacturers prefer to designate sizes of wires and twist drills by employing numbers while other manufacturers employ letters for designating sizes of their products. It is usually difficult to make adequate and dependable selection of the exact drill or wire to be used, and this occasions the constant use of micrometers or vernier calipers and decimal equivalents to determine the proper size drill desired. The use of micrometers enables the mechanic to effectively select the exact size of twist drill or wire to be used, but consumes considerable time. It is, therefore, an object of my invention to provide a precision instrument which will enable a mechanic to more readily select twist drill and wire sizes.

Referring now more in particular to the drawings, the numeral 6 points out a graduated scale fitted upon one end thereof with a jaw 7. This jaw 7 may be formed of a single piece of metal shaped as shown in Fig. 4, and fixed to the bar 6, and arranged flush with the end thereof and securely riveted. On the other end of the graduated member or bar 6 is inserted a stop pin 8 provided to limit the movement of parts of the caliper.

One side of the graduated bar or scale 6 is calibrated with numeralized graduations as shown in Fig. 1. The graduated scale will also preferably have etched thereon the expression "Numbers of steel wires and twist drills." This manner of numbered graduation is shown in Fig. 1. Upon the other side of the bar or scale 6 is etched or formed lettered calibration as shown in Fig. 2. This lettered calibration thus provides a graduated scale with letters for directly reading the sizes of steel wires and twist drills, and the bar should have etched thereupon the legend "Letters of steel wires and twist drills."

A graduated slide 10 is associated with the graduated scale bar 6. This graduated slide 10 is provided near each end thereof with guide retainers 11 and 12. These guide retainers 11 and 12 are made similar in design by bending a piece of stock metal in the center thereof which forms two parallel and spaced guide pieces. The spaced legs of the guides 11 and 12 receive the graduated slide, and are riveted or otherwise secured thereupon. In the drawings, the two guide retainers are shown riveted to the graduated slide 10. The upper ends of the guide retainers are spaced open with a pin 13 securely fixed therein. A leaf pressure spring 14 is depressed or corrugated in the center with each end thereof upturned and adapted to engage the upper edge of the graduated bar 6 by having its ends sufficiently impressed against the edge of the bar as to give adequate friction to hold the graduated scale 6 and graduated slide 10 in engagement one with the other. A spring 14 is used under each pin 13 and between the legs of each guide retainer. This brings the co-acting edges of the two scales together so that the sliding relation thereof will be effected through resistance which will act to hold the graduated bar and the scale in any set position.

The graduated slide 10 is calibrated by etching numeralized graduations thereon to conform to the graduations of the other scale 6. This slide 10 is also calibrated on the reverse side thereof with lettered graduations to conform to the lettered graduations of the upper scale 6.

On the numbered side of the instrument it is to be noted that there is etched upon each scale a 0 marking. This 0 marking appears in Fig. 1 where the scale 10 shows the 0 marking with an indexed line etched at right angles with the slide edge of the member 10, while the 0 marking of the graduated bar 6 is shown in dotted lines under the guide retainer 11. The Fig. 1 shows a No. 1 size drill or other body in position between the jaw and the end of the graduated slide. The No. 1 body so spaces the graduated bar 6 and the graduated slide 10 as to cause the similar reading indexes of the bar and slide to coincide with each other. This is shown in Fig. 1 where the index lines of one of each graduated member come coincident with each other. The drill or wire body No. 1 when removed from the measuring jaw of the instrument will permit the two graduated members to move one upon the other until the two 0 markings come coincident one with the other when the jaw lies against the end of the scale 10. In measuring drills and wire sizes the cutting end of the drill or the body of the wire will be inserted between the measuring jaws and the size thereof read direct from the graduated scale. The mechanic will run his eyes along the graduated scale until he finds two coincident index lines. These two coinciding index lines will give the exact size of the body held between the jaws of the measuring tool by showing two identical letters or numbers.

In Fig. 2 is depicted the measuring action of a lettered size body, such as a twist drill or wire. The lettered size "Z" commercially indicates the largest drill of that particular type and when the size "Z" is inserted in the measuring jaw the tool will reach its measuring limit by showing the coinciding index lines of the two "Z" markings. At this reading the guide 12 reaches its limit by abutting the stop pin 8.

Thus the precision tool herein disclosed adequately provides a mechanic with a caliper gage numbered on one side and lettered on the other side. By using this instrument he will be able to very speedily select the numbered or lettered sizes of drills and wires, and thus generally facilitate the mechanic's or toolmaker's work.

Having thus described my invention, what I claim as new, and desire to secure by Letters Patent is:

1. A caliper gage for directly reading lettered and numeralized sizes of drills and wires comprising, a bar graduated upon one side thereof with numeralized indexes, and graduated upon the other side thereof with lettered indexes, a slide co-acting with the graduated bar, said slide graduated upon one side thereof with numeralized indexes, and graduated upon the other side thereof with lettered indexes, so that a numeral or letter-sized cylindrical body is measured when the index on the bar is coincident with the same index on the slide, and receptive means related with the bar and slide for holding bodies to be measured.

2. A measuring instrument, comprising, a bar having a jaw, said bar etched with numeralized indexes upon one side and lettered indexes upon the other side, and a slide acting as a jaw co-acting with the bar, said slide etched on one side thereof with numeralized indexes and on the other side thereof with lettered indexes, such that coinciding index markings of the co-acting scales directly show the size of the body measured between the jaws.

RIHACHI ICHIBA.